United States Patent

Christianson

[15] 3,672,704
[45] June 27, 1972

[54] LIP-SEAL FITTING
[72] Inventor: Roger D. Christianson, Springfield, Mass.
[73] Assignee: Titeflex, a Division of Atlas Corporation, Springfield, Mass.
[22] Filed: April 17, 1970
[21] Appl. No.: 29,557

[52] U.S. Cl............................285/110, 285/174, 285/256, 285/334.4, 285/410
[51] Int. Cl......................................F16l 19/00, F16l 33/20
[58] Field of Search..............285/110, 334.4, 367, 174, 256, 285/410; 277/206, 236

[56] References Cited

UNITED STATES PATENTS

| 1,859,065 | 5/1932 | Anderson | 285/110 |
| 3,224,794 | 12/1965 | Crissy | 285/256 X |
| 3,142,498 | 7/1964 | Press | 285/305 X |
| 3,176,723 | 4/1965 | Hodgeman et al. | 285/110 |
| 2,937,893 | 5/1960 | Hill et al. | 285/410 X |
| 2,969,998 | 1/1961 | Rodaway | 277/236 X |
| 3,083,989 | 4/1963 | Press | 285/110 |

FOREIGN PATENTS OR APPLICATIONS

| 511,330 | 3/1955 | Canada | 285/110 |
| 1,537,146 | 7/1968 | France | 277/206 |
| 420,750 | 3/1967 | Switzerland | 285/110 |

Primary Examiner—Thomas F. Callaghan
Attorney—Louis Bernat

[57] ABSTRACT

The invention provides a gas-tight end-fitting for either a flexible hose or a rigid tubing of the type used in aircraft. To make a metal-to-metal seal one end of the fitting is a concave annular flange plate which deflects to form a seal at two points.

13 Claims, 6 Drawing Figures

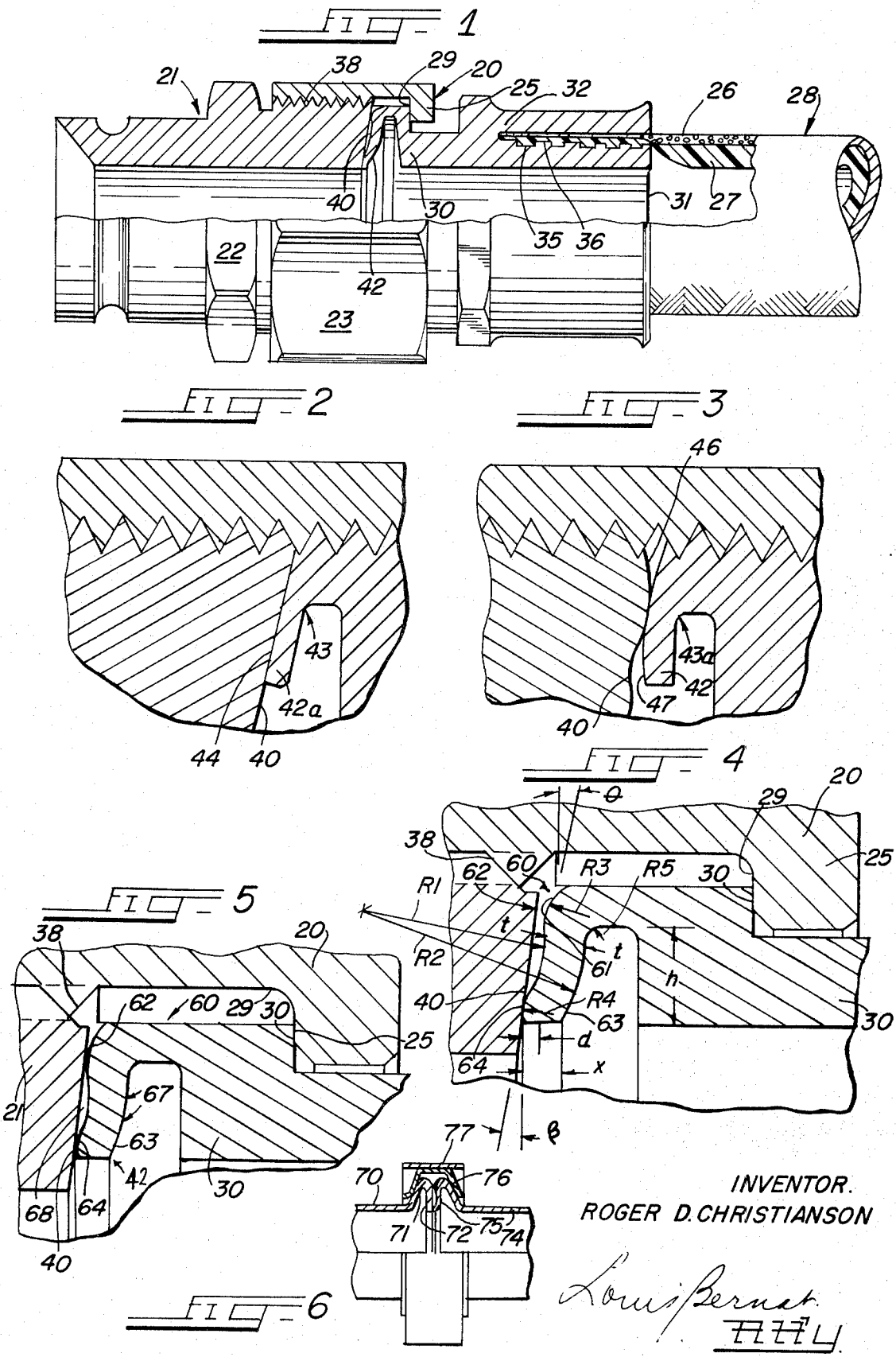

LIP-SEAL FITTING

This invention relates to metal-to-metal seals in the end-fittings of braided flexible hoses or rigid tubing, and more particularly to end-fittings of a type used in aircraft hoses.

Flexible hoses or rigid tubing of the described type have many uses for conveying fluids and gases, especially in vehicles such as airplanes. The characteristics of end-fittings for joining these hoses or tubes together include the obvious ones, such as providing gas-tight seals which do not leak under conditions of vibrations. When used in highly maneuverable supersonic aircraft, the end-fittings are subjected to the added stresses of many G's at extremely high altitudes of low atmospheric pressures. Still other of these obvious demands placed upon good metal-to-metal sealing end-fittings will readily occur to those who are familiar with the art.

It might be well to here review some of the other less obvious demands placed upon these fittings, which might not come to mind without substantial experimentation. For example, if the commonly prescribed high torque is required to secure a good metal-to-metal seal, it is sometimes very difficult and time consuming to replace hoses or tubes having the described end-fittings. This is especially true when the end-fittings are used in places where it is difficult to reach, while servicing the aircraft or other vehicle. Also, it should be possible to loosen and re-tighten ax end-fitting many times without causing any appreciable permanent deformation or distortion of the metal seal. It should not be possible to overstress the seal by over-tightening the fitting.

Yet another consideration is that any improved end-fittings should be compatible with similar end-fittings already in use. It would not be very helpful to provide a greatly improved end-fitting which could not be used on, or in connection with, existing aircraft without a large capital investment to replace all existing end-fittings. FInally, there are many existing military and civilian specifications which prescribe the dimensions, threads, metals, hardness, etc. for these end-fittings. Thus, as a practical matter, the designer of improved end-fittings must provide a device which meets or exceeds all existing specifications.

Accordingly, an object of the invention is to provide new and improved gas-tight end-fittings of the described type. Here, an object is to provide end-fittings which resist deformation despite many repeated assembly, disassembly, and re-assembly operations. In this connection, an object is to provide end-fittings which require less torque to secure a gas-tight seal.

Another object of the invention is to provide an end-fitting which is completely compatible with existing fittings. Here, an object is to meet all existing specifications, both military and civilian, for the described type of end-fitting.

Still another object is to provide end-fittings which may be made on general purpose tools. More particularly, an object is to avoid requiring high capital investments for entry into the market. Yet another object is to avoid requiring special jigs, tools, dies, and the like, in order to produce the improved end-fitting.

In keeping with an aspect of the invention, these and other objects are accomplished by a pair of threaded end-fittings. One fitting terminates at a seal in the form of a concave annular disc with a cross section in the form of a deflecting beam formed by a blend of several arcs. One of the arcs forms a heel or seal point which provides an annular bearing surface for stopping the advancing travel of the fitting while the seal is being closed. Another of the arcs forms a cantilevered spring or deflecting beam resting on a toe or second annular seal point. This second annular sealing surface is held tightly under a spring tension caused by a compression of the deflecting beam responsive to the fitting travel.

Since the seal depends to a large extent upon spring tension concentrating forces at relatively narrow seal points—instead of upon a broad face-to-face metal deformation—less torque is required to make a metal-to-metal, gas-tight seal. Also, the seal may be loosened and resealed many more times without causing a permanent deformation which makes the end-fitting useless. Moreover, any increase of gas pressure inside the fitting additively acts upon the spring tension to increase the seal at the toe end of the deflection beam.

The nature of a preferred embodiment of the invention may be understood best from the following description, when taken with the attached drawings, in which:

FIG. 1 is a perspective view, partly in cross section, showing the inventive end-fitting attached to a braided plastic hose;

FIG. 2 is a schematic view which shows a prior art end-fitting clamped in a closed and sealed position;

FIG. 3 is a schematic view which shows how the same prior art end-fitting becomes deformed after repeated loosening and resealing;

FIG. 4 shows the inventive end-fitting in a partly contacted position;

FIG. 5 shows the inventive end-fitting in a closed and sealed position; and

FIG. 6 shows an alternative embodiment wherein the end-fitting is attached to a metal tube.

A two-part end-fitting includes an internally threaded nut or socket 20 and an externally threaded nipple 21 which fit together in a mating configuration. To make an attachment, the outer threads of the nipple 21 are inserted into the inner threads of the nut or socket 20. One wrench is fitted over the faces 22, and another wrench is fitted over the faces 23. Then, the two wrenches are turned in opposite directions, and the nipple and socket come together in a gas-tight, metal-to-metal sealing fit.

The nut or socket 20 comprises a tubular shell or nut with a shoulder 25 which fits over a metal sleeve or insert 30. Braid 26 and a liner 27 form a braided hose 28. The liner 27 may be rubber or plastic, such as Teflon, and it may be convoluted. The metal sleeve 30 has a stop rib 29 of a contour which is complementary to the contour of the shoulder 25. A leading edge 31 on sleeve 30 slips inside the braided hose 28, and a collar 32, which is integral with sleeve 30, fits over the outside of the braided hose 28. Burrs or ribs 35, 36 are formed on the sleeve 30 to bite into the hose liner 27. Thus, the braided hose is locked to the end-fitting when the sleeve 30 is slipped into the liner 27 and the collar 32 is swaged over the outside of the braid.

As the two end-fitting parts 20, 21 are turned relative to each other on the threads 38, an annular seat 40 approaches an annular sealing member 42 on the end of the sleeve 30. When these end-fittings reach the extremity of their travel, the annular seal 42 is compressed against the seat 40 in a gas-tight seal.

This general type of end-fittings having metal-to-metal seals, described above, is known in the prior art. In fact, many military and commercial specifications are written around these end-fittings. Any new and improved end-fittings must be compatible and usable interchangeably with these fittings. The new socket or nipple should be usable with the old nipple or socket, respectively.

These prior art end-fittings have generally included a metal-to-metal frusto-conical sealing flange at the end 42a (FIG. 2). This flange flexes and is tightly compressed against the seat 40, as shown in FIG. 2. The flange generally bends as a lever arm about a hinge point 43 where fatigue stresses are concentrated. Thus, in FIG. 2, almost the entire bending forces occur near the point 43. Also, as shown, there is no relief space at the interface between the seat 40 and the closed seal 42. Therefore, relatively great torque forces are required to tighten the seal because there is a maximum friction at the seat—increased by any spring tension in the compressed flange 42a. If the seal is overtightened to exceed the limits of elasticity, the flange seal 42a must take a permanently deformed set. Moreover, the non-undercut region 44 functions as a bearing seat for stopping the fitting travel. If there is an overstress at this point, there is a permanent deformation of this bearing part of the seal.

FIG. 3 accurately reproduces photographs actually taken of a cross section of the prior art end-fittings which have been repeatedly assembled, loosened, and re-assembled. As this drawing clearly shows, the bearing surface 46 was flattened by the repeated and excessive pressures at the bearing surface. Also, the hinge point 43a of the sealing flange has experienced an excessive fatigue. As is clearly seen, this point has been bent to produce a permanent memory which lifts or deflects the toe end 47 of the sealing flange away from the bearing seat 40. As a result, even greater torque forces are required to tighten the seal, thereby causing a still greater distortion of the sealing surface.

To overcome these and other disadvantages, the invention provides a novel sealing end-fitting 60 (FIG. 4). The cross section of the fitting has a concave annular flange. The flange is in the form of a concave deflecting beam having at least two arcs blended together in a smooth curve. One arc 61, of the cross section, forms a heel area which comes to rest at a single point 62 on the seat 40. This restricted contact area concentrates the sealing pressure in an annular ring, without requiring an excessive torque, since the bearing friction is minimized. The second arc 63, in the cross section of the deflection beam, provides an elastic arch resting on a toe area 64 which also forms an annular shaped seal point, concentrically positioned inside the seal point 62. As the fitting is tightened, the beam 63 deflects and a spring bias in arch of the beam presses down at the toe point 64.

FIG. 5 shows the inventive end-fitting in a tightly closed position. As the socket 20 and nipple 21 turn relative to each other and come together on threads 38, the shoulder 25 inside the socket presses against a similar shoulder in the sleeve 30. The concave annular sealing flange, on the sleeve 30, is pressed into a metal-to-metal gas-tight seal against the seat 40. There is a seal at the two concentric annular points 62, 64. Any gas or fluid pressure (symbolically shown at arrows 67) inside the end-fitting acts against the deflection beam at 63 to press the seal together with even greater forces. Thus, there is a sealing pressure responsive to the compression of the end-fitting flange caused by the travel in the threads 38. There is also a sealing pressure responsive to the spring-like elasticity in the arch of the beam. Finally, there is a sealing pressure from the gas pressure inside the fitting.

It should be noted that even after the fitting is fully closed, as shown in FIG. 5, there is a relief space 68 which would permit an even greater compression of the beam 63. Thus, there is a good, gas-tight seal without exceeding the elastic limits of the beam 63.

The object of the concave or arcuate surface shown on FIGS. 4 and 5 is to limit the amount of contact between this end-fitting and the mating end-fitting. The points of contact are at the extended lip 64 and a secondary contact seal and positive stop 62, near the outer perimeter. When the lip of this fitting is deflected by the mating fitting, it deflects in such a manner that the cross section of the lip can be likened to the deflection curve of a cantilever beam. The effort is to assure that the loading force is concentrated on a single peripheral line at the edge of the lip while it is being deflected.

To better understand how I arrive at the shape and cross-sectional contour of the annular seal, consider:
 the heel section 61 as an arc with a radius R3;
 the outside surface of the deflection beam 63 as an arc with a radius R1;
 the inside surface of the deflection beam 63 as an arc with a radius R2; and
 the tip of the beam 63 as an arc curve which is reversed from curve 63 with a radius R4.

The angle $\theta$ is the angle with an apex at heel point 62 through which an average center line of the beam 63 travels as it deflects from the relaxed position (FIG. 4) to the sealed position (FIG. 5).

The angle $\beta$ is the angle with an apex at the toe point defined by an average center line of the beam 63 and a radius perpendicular to the longitudinal axis of the socket 20 and nipple 21 [this is the relaxed flare of beam 63 (FIG. 4)].

The distance d is the liner travel experienced by the tip when moving from the relaxed position (FIG. 4) to the sealed position (FIG. 5).

The beam 63 has a thickness $t$.

The letter $h$ indicates the depth of the undercut region forming the beam 63.

Using these definitions, the surface contour of flange 63 can be defined by the following empirical formulas:
 a. Inside diameter (I.D.) and outside diameter (O.D.) are empirically established by the confines of tube and fitting parameters.

(b) $$R_1 = \frac{(\tan\theta)\left(\frac{A-I.D.}{2}+R_3\sin\theta\right) - (R_3\cos C_1\theta - R_3\cos\theta)}{2C_2\sin\beta\left[\cos(90° - \beta + C_1\theta)\right]}$$

Where
$\beta = \text{Arctan}$
$$\left[\frac{(\tan\theta)\left(\frac{A-I.D.}{2}+R_3\sin\theta\right) - (R_3\cos C_1\theta - R_3\cos\theta)}{C_2\left(\frac{A-I.D.}{2}+R_3\sin C_1\theta - C_3\right)}\right]$$

$C_1$ = Constant proportional to $t\,\delta/E$ within the limits of 0 to 0.75—normally at 0.41

$C_2$ = Constant proportional to $C_1,\theta/R_1$ within the limits of 0.50 to 0.75 —normally at 0.571

$C_3$ = Constant proportional to $R_4$ within the limits of 0.004 to 0.020 — normally 0.008 c. $R_2 = R_1 + t$ d. $R_3$ is defined by fitting O.D. and $h$ dim.

e. $R_4$ = Constant within the limits of 0.010 to 0.050—normally 0.030 f. $h = C_4(\text{I.D.}) + R_5$
 $C_4$ = Constant proportional $1/\text{I.D.}$ within the limits of 0.5 to 1.5—normally at 0.6 g. $R_5$ = Constant within the limits of 0.015 to 0.040—normally 0.018 h. $t$ is proportional to $\delta x/E$ within the limits of 0.010 to 0.050—normally 0.022 i. $x = (\text{Tan}\,\theta)\left[(A - \text{I.D.}/2) + R_3\sin\theta\right] - (R_3\cos C_1\theta - R_3\cos\theta)$ j. $\theta = 0°$ to $20°$ normally $8\frac{1}{2}°$ The end-fitting has many uses other than in connection with braided hoses. For example, a metal tube may be substituted for the braided hose 28. Any of many different methods and configurations may be used to weld, braze, crimp, or otherwise attach a tube to the sleeve 30.

Another method of using the inventive seal is disclose in FIG. 6. Here, a first metal tube 70 has an end which is flared and flattened at 71 to form a seat which is similar to the seat 40. A second metal tube 74 has an end which is flared and formed into an annular concave seal 75. The seal 75 is similar to the seal 42 of FIG. 1, with the blended arcuate contours described above in connection with FIGS. 4 and 5.

To draw the two tubes 70, 74 together into a sealed condition, an annular clamp 76 is fitted over the outside of the two flared ends 71, 75. This clamp 76 has a double wedge V-shaped cross section which may be pressed down toward the center of the tubes to wedge the flared ends together. An outer band 77 may be pressed on over the V-band 76 to hold it in a position which tightly wedges the parts 71, 75 together.

Still other embodiments provide a flange plate which is bolted into position, as a substitute for the socket nut 20. Yet another embodiment involves a spring biased sleeve which also substitutes for the socket nut 20 to provide a quick disconnect terminal. Still other uses and embodiments will readily occur to those who are skilled in the art.

While different materials may be used, I prefer to use stainless steel, inconel, and aluminum alloys.

Any of a number of different metal alloys may be selected to make end-fittings according to the invention. So that desired characteristics of such alloys may be known, a partial listing of certain alloys which exhibit the desirable modulus of elasticity and rigidity, substantially minimal deformation and coefficient of expansion have been tested and found to be acceptable:

| MATERIALS | COMPOSITION | |
| --- | --- | --- |
| 17–4 PH Stainless Steel | Iron | balance |
| | Chromium | 16.5% |
| | Nickel | 4.0% |
| | Copper | 4.0% |
| | Cobalt and Tantalum | 0.3% |
| Inconel Alloy 718 | Nickel | balance |
| | Chromium | 18.60% |
| | Iron | 18.50% |
| | Aluminum | 0.40% |
| | Titanium | 0.90% |
| | Cobalt | 5.00% |
| | Molybdenum | 3.10% |
| | Carbon | 0.04% |
| Ti–6 Al–4V | Titanium | balance |
| | Aluminum | 6.50% |
| | Vanadium | 4.00% |
| | Carbon | 0.08% max. |
| | Iron | 0.25% max. |
| Aluminum 6061 | Aluminum | balance |
| | Silicon | 0.60% |
| | Copper | 0.25% |
| | Manganese | 1.00% |
| | Chromium | 0.25% |

A number of other similar alloys may also be used.

A number of end-fittings, made according to the invention, were actually assembled, disassembled, and re-assembled at least as many times as the badly deformed prior art fitting, shown in FIG. 3. Essentially, the same testing procedures were followed when testing both types of end-fittings. After the testing was completed, the inventive fitting did not show any substantial wear. No leakage was detected. It was not necessary to tighten any of the inventive fittings to the high torque regularly prescribed in most military and civilian specifications.

In addition to the other desirable qualities noted above, the inventive seal retains and improves all of the fine qualities attributed to fittings of this general type. Among other characteristics, this type of fitting is substantially lighter than other fittings with comparable capabilities. The structure of the fitting is stronger and smaller than required by many civilian and military specifications. The surface of the seal need not be machined to as fine a finish as is required by other types of fittings. Less turning is required to make a tight coupling since there is a low protrusion factor. Still other advantages will readily occur to those who are skilled in the art.

The foregoing description of a preferred embodiment of the invention will suggest other alternatives and modifications to those who are skilled in the art. Therefore, the appended claims are to be construed to cover all equivalents reasonably falling within the true scope and spirit of the invention.

I claim:

1. An end-fitting for tubular members having an internal pressure of fluid or gas, said fitting comprising a first tubular part, a second tubular part and means for securing the parts together in a fluid or gas-tight seal, one of said parts having a seat therein, the other of said parts having a concave annular seal comprising inner and outer surfaces with a cantilevered deflection beam having a cross section of substantially uniform thickness, said concave seal forming a cavity exposed to the pressure of said fluid or gas, the sealing surface of said cross section being a blend of at least two arcs, one of said arcs forming a first annular sealing point at the heel of the beam, and the toe of the other of said arcs forming a second concentric annular sealing point, said concave beam being arched on both inner and outer surfaces between said two annular sealing points, said first and second sealing points being shaped to form concentric wear resistant contact areas with respect to said seat.

2. The end-fitting of claim 1 wherein said arch provides a clearance between said annular seal and said seat when said end-fittings are brought together in a fluid or gas-tight seal.

3. The end-fitting of claim 1 wherein said first annular sealing point provides a stop for limiting the travel of said nipple in said socket.

4. The end-fitting of claim 1 wherein said flexible hose is a plastic liner covered with a braid cover, said annular seal is at one end of a metal sleeve, the other end of the metal sleeve being shaped to bite into and hold the braided hose.

5. The end-fitting of claim 1 wherein there is a metal-to-metal seal comprising a configuration wherein said seal is compressed against said seat by a travel of said parts relative to each other, a spring-like elasticity in said arch, and fluid or gas pressure inside said fitting.

6. The end-fitting of claim 5 wherein said first and second parts are metal tubes, the opposite and mating ends of said tubes being flared and shaped to form said seat on said first part and said concave flange on said second part.

7. The end-fitting of claim 6 and an annular clamp means fitted over the two flared ends, said clamp having a double wedge V-shaped cross section which presses down over said flared ends, and draws them together.

8. The end-fitting of claim 5 wherein at least one of said parts is attached to a metal tube.

9. The end-fitting of claim 5 wherein said arch has a radius $R_1$ described by the following formula:

$$R_1 = \frac{(\tan\theta)\left(\frac{A-I.D.}{2}+R_3\sin\theta\right)-(R_3\cos C_1\theta - R_3\cos\theta)}{2C_2\sin\beta\,[\cos\,(90°-\beta+C_1\theta)]}$$

Where $\beta = $ Arctan $$\frac{(\tan\theta)\left(\frac{A-I.D.}{2}+R_3\sin\theta\right)-R_3\cos C_1\theta - R_3\cos\theta}{C_2\left(\frac{A-I.D.}{2}+R_3\sin C_1\theta - C_3\right)}$$

I.D. = inside diameter of the beam $C_1 = $ Constant proportional to $t\,\delta/E$ within the limits of 0 to 0.75—normally at 0.41

$C_2 = $ Constant proportional to $C_1$, $\theta/R_1$ within the limits of 0.50 to 0.75—normally at 0.571

$C_3 = $ Constant proportional to $R_4$ within the limits of 0.004 to 0.020—normally 0.008

$R_2 = $ The radius $R_1$ plus the thickness of the beam $R_3 = $ The radius at the heel of the beam $\theta = $ The travel of a beam during the tightening of the seal which is less than 20°.

10. The end-fitting of claim 9 wherein said beam is formed by an undercut region terminated by a constant radius $R_5$, within the range of about 0.015 to 0.040 inch, the depth of said undercut region being the inside diameter of said beam plus said radius $R_5$ multiplied by a constant within the range of 0.5 to 1.50.

11. The end-fitting of claim 10 wherein the beam has a thickness $x$ described by the formula:

$$x = (\mathrm{Tan}\,\theta)\left(\frac{A-I.D.}{2}+R_3\,\mathrm{Sin}\,\theta\right) - (R_3\,\mathrm{Cos}\,C_1\theta - R_3\,\mathrm{Cos}\,\theta)$$

12. The end-fitting of claim 11 wherein said angle $\theta$ is about 8.5°.

13. A hard metal nipple for a braid covered hose fitting of the type having a barrel for insertion in the end of the hose and a portion for effecting a metal-to-metal seal with an independently secured fitting sleeve, said hose having an internal pressure, comprising an annular body, a barrel extending axially from said body on one side thereof, a concave annular flange having a bearing surface at the heel thereof, said flange forming a cavity exposed to the pressure in said hose, said bearing surface being formed with an arc curving oppositely to the arc of said concave flange on said one side of said body adjacent the outer margin thereof, and said annular flange having curved inner and outer surfaces with uniform thickness therebetween and being joined to said body at the inner margin of said bearing surface, said flange making an acute angle with the nipple axis, said flange being arched between said bearing surface and the inner margin of said flange with two concentric sealing areas, said inner margin terminating in a wear resistant contact area, whereby said flange is adapted to be flexed into a position along the projected surface of said bearing surface and resiliently engage a fitting sleeve to form said two concentric sealing areas therewith.

* * * * *